United States Patent [19]

Pohlmann et al.

[11] Patent Number: 5,504,764

[45] Date of Patent: Apr. 2, 1996

[54] MICRO-HEATPIPE COOLING OF SOLID-STATE SLAB

[75] Inventors: Juergen L. W. Pohlmann, Alexandria, Va.; Richard B. Minch, Woodinville, Wash.

[73] Assignee: The United States of America as represented by the Secretary of the Army, Washington, D.C.

[21] Appl. No.: 352,025

[22] Filed: Nov. 30, 1994

[51] Int. Cl.$^6$ ...................................................... H01S 3/00
[52] U.S. Cl. .................................... 372/34; 372/35; 372/36
[58] Field of Search ................................... 372/34, 35, 36

[56] References Cited

U.S. PATENT DOCUMENTS 4,791,634  12/1988  Miyake ........................................ 372/34
5,253,260  10/1993  Palombo ..................................... 372/34
5,394,426   2/1995  Joslin .......................................... 372/36

Primary Examiner—Rodney B. Bovernick
Assistant Examiner—Robert E. Wise
Attorney, Agent, or Firm—Milton W. Lee; Alain L. Bashore; John E. Holford

[57] ABSTRACT

A solid-state laser slab amplifier arrangement for the output of a laser beam at optimal working conditions. Pump energy is applied to a solid state lasing material so as to irradiate the solid-state lasing material and effect a laser beam with resultant waste heat output. At least one micro-heatpipe bundle which includes multiple micro-heatpipes allows waste heat to be transported away by the working medium through an approximate center of an individual micro-heatpipe from the solid-state lasing material. After condensation, liquid working medium is returned substantially by capillary action through approximate off-center areas of the individual micro-heatpipe.

4 Claims, 4 Drawing Sheets

5,504,764

MICRO-HEATPIPE COOLING OF SOLID-STATE SLAB

BACKGROUND OF THE INVENTION

1. Field of the Invention

The present invention generally relates to optically pumped solid-state lasers and more specifically, to a device, arrangement, and method for removing excess heat from a solid-state lasing slab in order to stabilize the lasing operation.

2. Description of Prior Art

Generally, the conversion of incoherent optical energy into coherent optical radiation is accompanied by the generation of heat which must be removed from the device essentially instantaneously. While much effort has been made to efficiently and effectively remove waste heat from diode laser arrays, the removal of waste heat from the solid-state lasing material has been found to be more challenging. Cooling of the lasing medium avoids or negates the build-up of temperature gradients and thereby the strain and stress in the lasing host material. Thus, variation of the refractive index and optical distortion can be largely controlled or avoided. The immediate result is improved beam quality and/or increased average power in the laser output. The removal of waste heat and the concurrent thermal management of the lasing medium also is the most important issue and the premiere factor limiting scale-up to compact, high-power solid-state laser devices.

The currently most energy-efficient method to generate high-power, coherent optical radiation, utilizes the output of a number of compact diode laser arrays to pump a solid-state medium containing the lasant or lasing species of choice. While the prior art has reported using cooling systems and techniques to cool diode laser arrays, none have established a basis for a specific apparatus that is dedicated to the task of resolving the particular problem at hand. What is needed in this instance is an apparatus and technique for the removal of thermal energy from solid-state lasing materials without direct heat exchange medium contact such that there is no performance deterioration.

SUMMARY OF THE INVENTION

It is therefore one object of the invention to provide an apparatus and technique for the removal of thermal energy from solid-state lasing materials without direct heat exchange medium contact such that there is no performance deterioration.

There is disclosed a solid-state laser slab amplifier technique and arrangement for the output of a laser beam at optimal working conditions. A solid-state lasing material is provided which is irradiated thus effecting a laser beam output and waste heat. A micro-heatpipe bundle allows for passively removing waste heat from the irradiated lasing material such that no heat exchange working medium contacts the solid-state lasing material, thereby effecting heat removal that is substantially proportional to demand resulting in a predetermined operating temperature range being achieved.

The embodiment disclosed is operated in a master oscillator/power amplifier (MOPA) configuration. A well characterized, coherent seed beam of about 5 Mwatt is radiated into the amplifier slab which receives nominally 1000 Watt optical energy from the diode laser pumping devices. Since the optical-to-optical conversion efficiency is 40%, the amplified laser beam has a nominal time-averaged output of 400 Watts in the same pulse format as provided by the seed beam from the master oscillator. Consequently, the 5 micro-heatpipe bundles utilized, which are thermally bonded by a thin contact layer to the slab, must remove about 600 Watts of waste heat. This cooling requirement of 60 Watts per square centimeter exceeds the performance requirement of forced high-velocity convection of pressurized gases or liquids, but is accomplished with the micro-heatpipe bundles. With a working medium of ammonia/water, the amplifier device is thus biased (or thermostated) for an optimal working condition at 50 degrees C.° operating temperature.

BRIEF DESCRIPTION OF THE DRAWINGS

The foregoing and other objects, aspects, and advantages will be better understood from the following detailed description of a preferred embodiment of the invention with reference to the drawings, in which.

DETAILED DESCRIPTION OF A PREFERRED EMBODIMENT OF THE INVENTION

Figure 1:
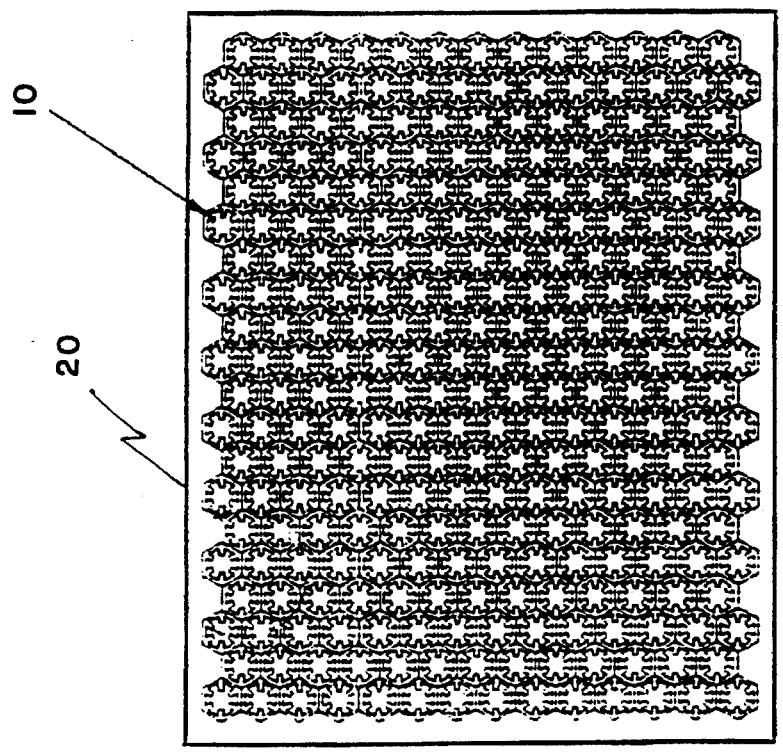
FIG. 1 is an exploded detail view of the cross section of individual micro-heatpipes at the evaporator end.

Referring now to the drawings, and more particularly to FIG. 1 is an exploded view detailing an arbitrary cross section of individual micro-heatpipes 10, where individual micro-heatpipe having a free cross-sectional area 11. The individual micro-heatpipes are fabricated of metal or alloy walls 12 each thermally isolated at layer 13. Heat is transported within each of the micro-heatpipes by a naturally induced counter-current flow of gaseous and liquified medium. As individual micro-heatpipes respond to local demand, heat is taken up by evaporation of the liquid working medium and transported as gas or vapor through the open center channel 14 to the condenser end where it is dissipated to an external coolant circulating through an encasement. After condensation of the vapor at the condenser/radiator end, the working medium returns to the evaporator area as a liquid by capillary action inside the grooves or channels 15. The specific working ranges of a micro-heatpipe depend on the working medium used, for example ammonia (–60° C.—100° C.) or water (30° C.–100° C.) but are not the same as those for regular macro-heatpipes as the design parameters used introduce different flux versus temperature relationships. It is understood that the working mediums and ranges are illustrative only and are in no way limiting of the present invention. Micro-heatpipes are available from Xemet, Inc. of Redond, Wash.

Figure 2:
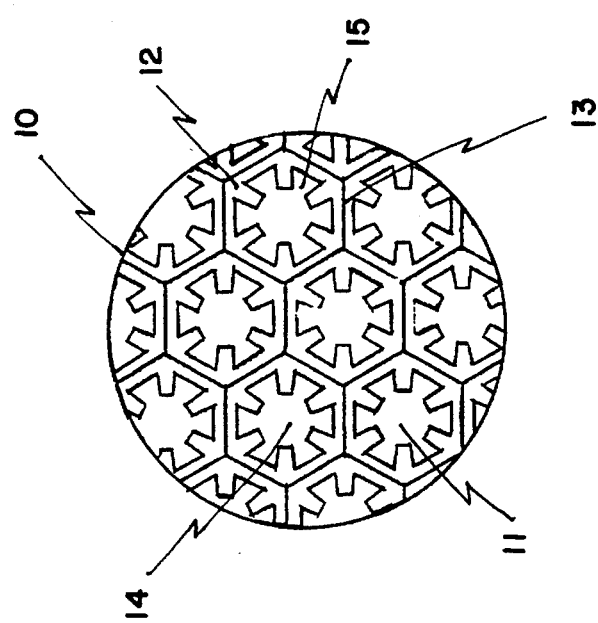
FIG. 2 is a cross section of the micro-heatpipe bundle made up of many individual micro-heatpipes shown in FIG. 1.

In FIG. 2 there is shown a complete cross section of a micro-heatpipe bundle 20 utilized in the present invention. Bundle 20 is composed of individual micro-heatpipes 10 of FIG. 1 densely packed together whereby a coating or thin layer such as an oxide layer as layer 13 which provides thermal isolation between the individual micro-heatpipes at the evaporator end. While the diameter of each individual heatpipe 10 is in the order of a fraction to a few millimeters, the length and the dimension of the bundle is determined by the overall system design and is usually 5 centimeter or longer. A rectangular cross-section is shown in FIG. 2 and is utilized in the present invention because it corresponds best to the cross-section of the pumping heads and fits the geometry of the glass slab. However, any other configuration can be produced to conform to the lasing glass and to achieve best possible heat exchange. Micro-heatpipes are thermally contacted to the surface of solid-state material and do not interfere with optical requirements for the laser rod or slab. No vibration or other mechanical disturbances affecting the output of the optical beam is caused by the micro-heatpipe.

Figure 3:
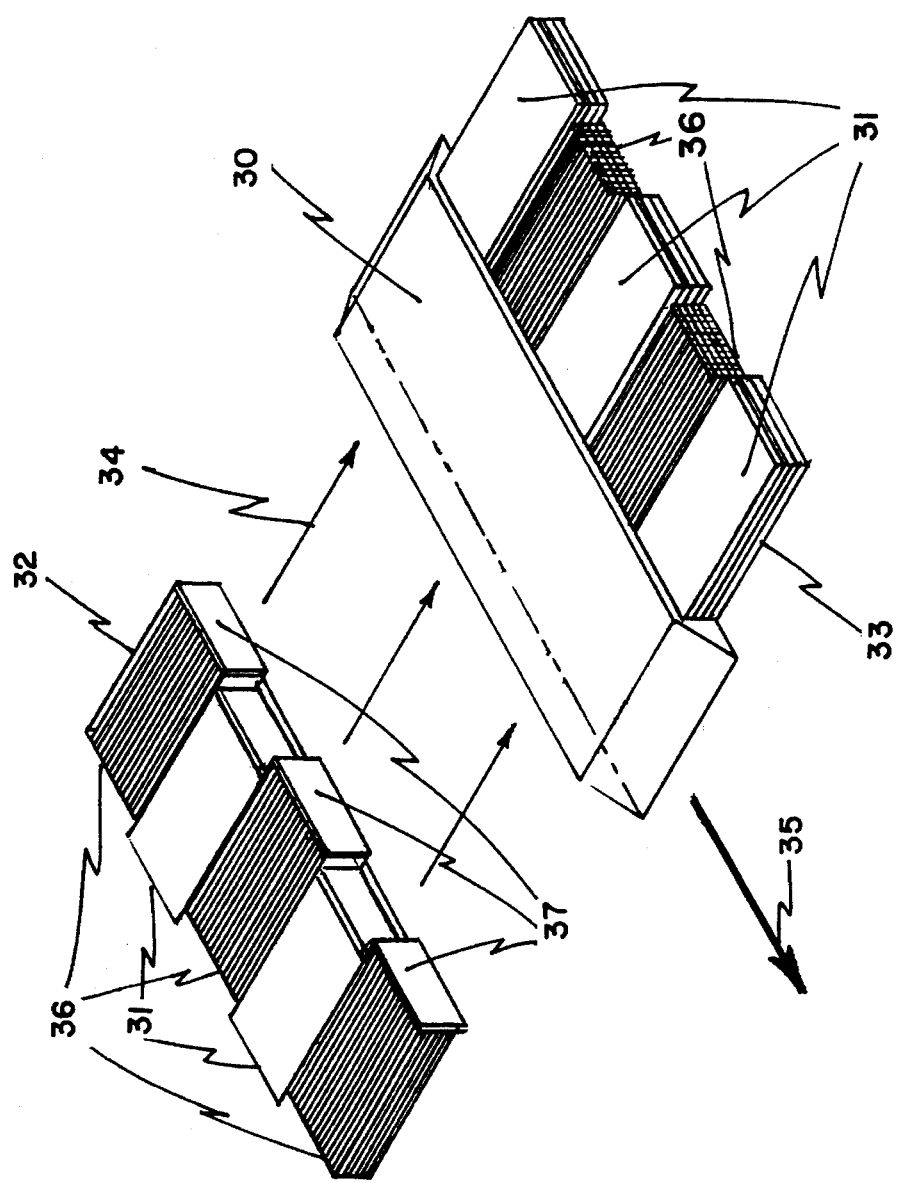
FIG. 3 is a schematic diagram of the present invention as a pumped and cooled dual configuration in partial exploded view.

FIG. 3 is a schematic diagram in partial exploded view of the present invention as a side-pumped/cooled dual configuration for the removal of thermal energy from a solid-state lasing medium 30. It is understood that the invention is not limited to a particular lasing medium but that any solid-state lasing medium may be used in any practical geometric configuration. As shown in subassemblies 32 and 33, cooling micro-heatpipe bundles 36 and pumping heads 31 alternate side by side and in juxtaposition along the solid-state laser medium 30. It is also understood that the invention is not limited to a specific pumping head means, but that any method generating optical radiation may be utilized. Pumping head means may include flashlamps, arclamps, chemical reactors, or laser diode arrays. Only part of the energy 34 radiated into lasing medium 30 is utilized to amplify laser beam 35, the rest generates absorption heat which must be removed. The evaporator or radiator ends 37 of the micro-heatpipes are in sufficient thermal contact with 30 through use of a thin bonding layer and are physically located next to the pumping heads 31. This assures an immediate removal of the absorption heat without significant lateral heat spread, as each individual micro-heatpipe responds to the demand it encounters. This response mechanism is especially effective when oxide coatings thermally isolate the individual micro-heatpipes against each other for a length that exceeds the heat diffusion depth in the material they are made of.

For optimal thermal management, pumping areas and heatsinking areas would be finely interlaced to obtain the most uniform operating conditions during lasing. Micro-heatpipes are closed systems; by proper selection of the working fluid, the lasing medium can be stabilized at its optimal operational condition, independent of the temperature requirement of the laser diode-arrays or other pumping heads. Configuration of the Micro-heatpipes can be in such a way that the heat dissipation is accomplished far away from the laser rod or slab, leaving maximum surface area and working volume available for the pumping diode-arrays or other radiation sources. Failure of an individual micro-heatpipe will be compensated for by its closest neighbors, and does not automatically lead to shut-down or self-destruction of the laser device. The operation of micro-heatpipes does not depend on gravity, and thereby imposes few or no design constraints. This fact makes micro-heat-pipes very attractive for cooling operations in space.

Figure 4:
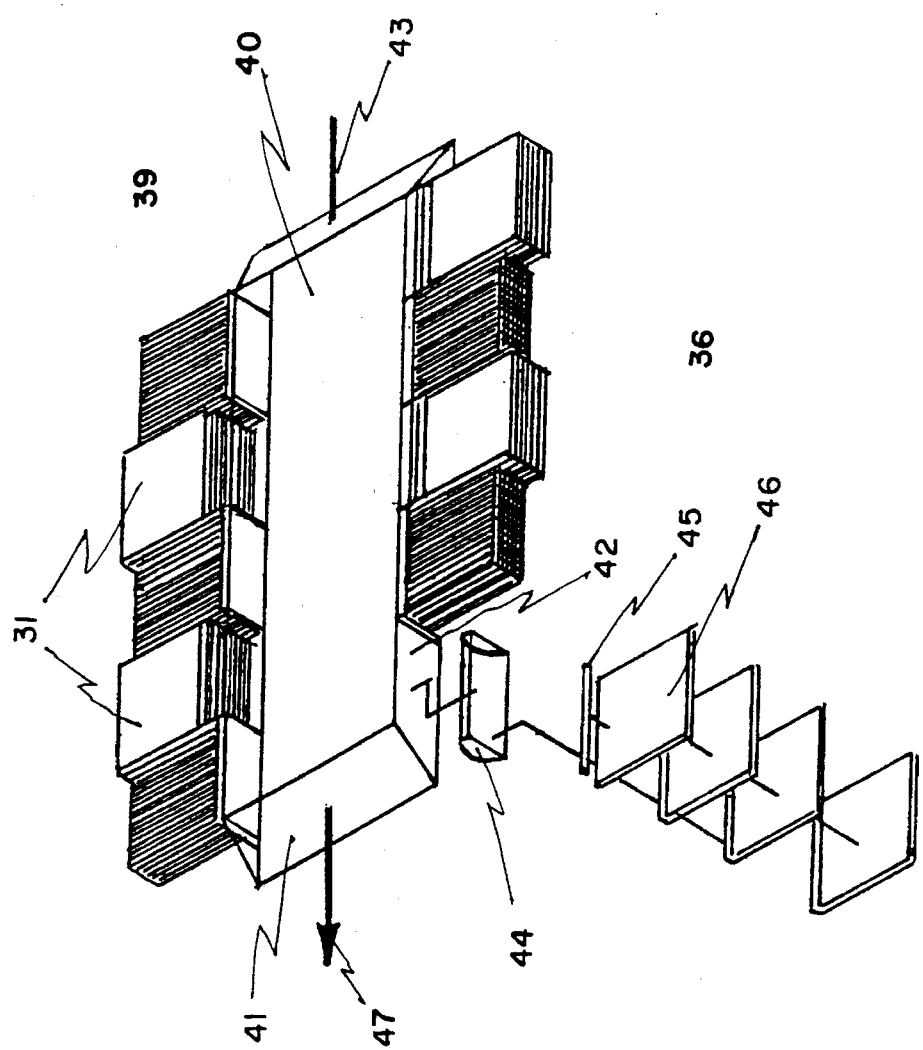
FIG. 4 is a schematic diagram of the present invention utilized in an optically pumped solid-state laser slab system.

FIG. 4 is a schematic diagram of the present invention as utilized in a side-pumped solid-state laser slab amplifier. Solid-state laser slab 40 is a Neodymium-doped Yttrium Aluminum Garnet (Nd:YAG), approximately 10 cm ling, 4 cm wide, and 1 cm high, with Brewster angle 41 cuts on both faces. The pumping laser diode arrays 31 have a face area about 2 cm wide and 1 cm high and provide time-averaged optical energy of approximately 100 Watt per square centimeter at a wavelength of 804 nm. The detailed arrangement of the diode lasers is shown for one pumping head. The individual, linear diode bars 45 are mounted on the front end of heatsinks 46 and stacked to a height of 1 cm. The divergent radiation of all laser bars in that stack is collected by a cylindrical lens 44 and focused into laser slab 30 that has an anti-reflection coating 42 on all side surfaces.

The device shown in FIG. 4 is operated in a master oscillator power amplifier (MOPA) configuration. A well characterized, coherent seed beam 43 of about 5 Mwatt is radiated into the amplifier slab which receives nominally 1000 Watt optical energy from the diode laser pumping devices. Since the optical-to-optical conversion efficiency is 40%, the amplified laser beam 47 has a nominal time-averaged output of 400 Watts in the same pulse format as provided by the seed beam from the master oscillator. Consequently, the 5 micro-heatpipe bundles 36, which are thermally bonded by a thin contact layer 39 to the slab, must remove about 600 Watts of waste heat. This cooling requirement of 60 Watts per square centimeter exceeds the performance requirement of forced high-velocity convection of pressurized gases or liquids, but can be accomplished with micro-heatpipes. By judicious selection of an appropriate working medium, which in this embodiment is ammonia/water, the amplifier device is biased (or thermostated) for optimal working condition at 50 degrees operating temperature.

Figure 5:
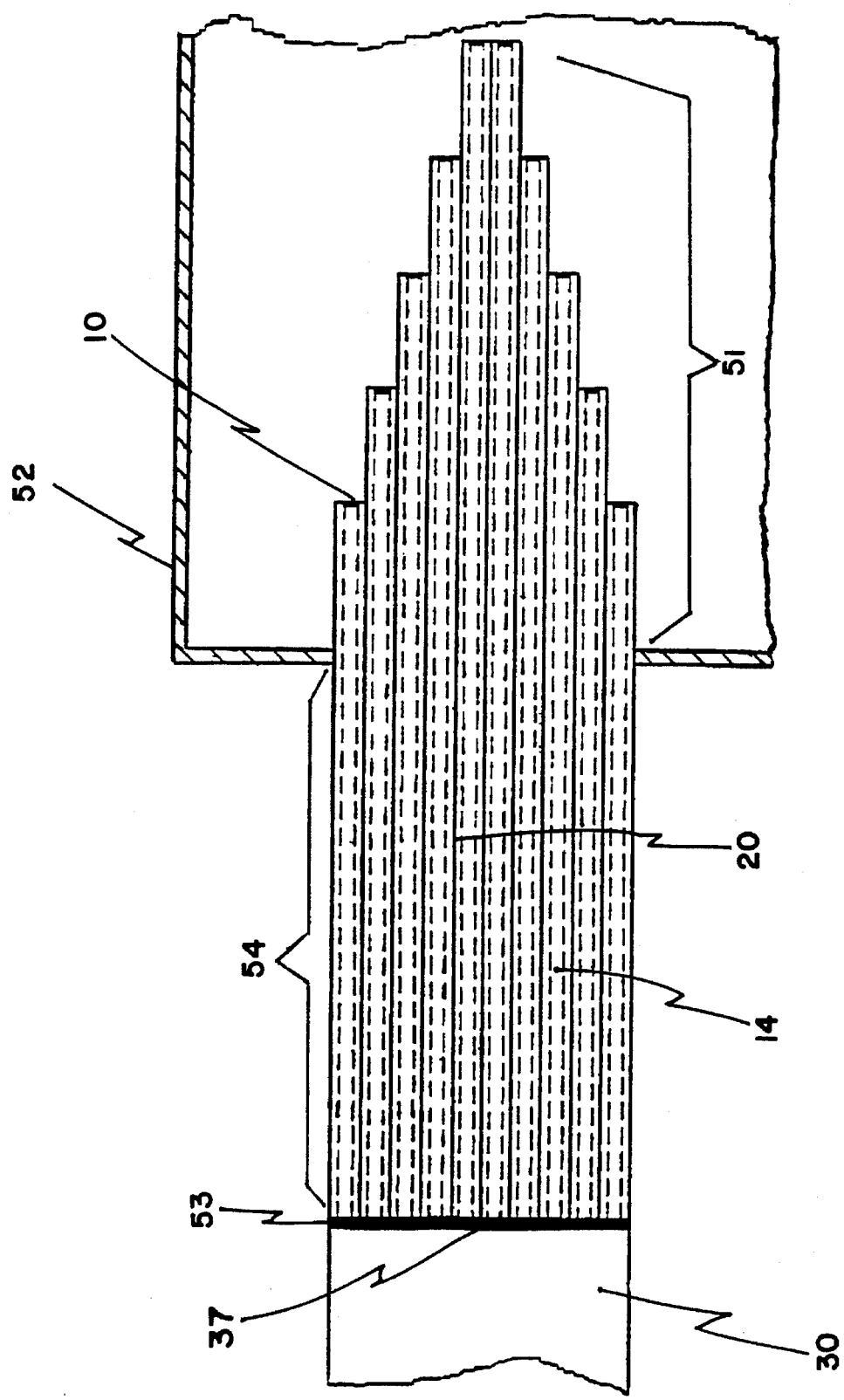
FIG. 5 is a cross section of a micro-heatpipe bundle bonded to the side surface of a solid-state laser slab as utilized in the embodiment of FIG. 4.

FIG. 5 depicts the cross section of a solid-state laser slab 30 with a micro-heatpipe bundle 20 bonded to its side surface utilized in the embodiment of FIG. 4. With individual micro-heatpipes 10 responding to local demand, heat is transported by the gaseous working medium through the open center channel 14 to the condenser/radiation end area 51 and dissipated to an external coolant circulating through encasement 52. After condensation at area 51, the liquid working medium returns by capillary action in the side channels 15 to the evaporator end area 53. The overall length of the micro-heatpipe bundle 20 is determined by the engineering requirements. Heat is removed directly from points of origin or from surface area close to origin. Heat removal is passive and proportional to demand; hot spots are negated or avoided. The heat exchange medium (working fluid) does not get into contact with laser glass and therefore does not leach out or erode optical material of rod or slab.

While this invention has been described in terms of preferred embodiment consisting of a pumped solid-state laser slab system, those skilled in the art will recognize that the invention can be practiced with modification within the spirit and scope of the appended claims.

Having thus described the invention, what we claim as new and desire to secure by Letters Patent is as follows:

1. A solid-state laser slab amplifier arrangement for the output of a laser beam at optimal working conditions including:

a solid-state lasing material;

means for applying pump energy to said solid-state lasing material so as to irradiate said solid-state lasing material, thus effecting from the irradiated solid-state lasing material a laser beam and waste heat output;

at least one heatpipe bundle which includes multiple heatpipes, said bundle coupled to said solid-state lasing material, such that in each of the individual heatpipes there is effected waste heat transported away by the working medium through an approximate center of an individual heatpipe from the solid-state lasing material, and after condensation there is effected liquid working medium return substantially by capillary action through approximate off-center areas of the individual heatpipe, such that the heat exchange working medium does not contact said solid-state lasing material and there is also effected heat removal that is substantially proportional to demand, and heat removal directly from or approximate to points of origin, thereby resulting in a predetermined operating temperature range being achieved.

2. The solid-state laser slab amplifier arrangement of claim 1 wherein the heatpipe is a micro-heatpipes further charactereized in that each micro-heatpipe has an approximate diameter on the order of millimeters or fractions thereof.

3. A technique for optimizing the lasing conditions of a solid-state laser slab amplifier, including the steps of:

providing a solid-state lasing material;

irradiating said solid-state lasing material for effecting from the irradiated solid state lasing material a laser beam output with an undesirable waste heat component;

transporting the waste heat away from the lasing material by a vapor phase working medium through individual, whereby the vapor is condensed and returned to the working medium for further cooling of the laser slab such that no heat exchange working medium contacts said solid-state lasing material, thereby effecting heat removal that is substantially proportional to demand, and heat removal directly from or approximate to points of origin, thereby resulting in a predetermined operating temperature range being achieved.

4. The technique for optimizing the lasing conditions of a solid-state laser slab amplifier of claim 3, further including the step that each heatpipe is fabricated as a micro-heatpipe further charactereized in that each micro-heatpipe has an approximate diameter on the order of millimeters or fractions thereof.

* * * * *